US008874095B2

(12) United States Patent  
Anthony, Jr. et al.

(10) Patent No.: US 8,874,095 B2
(45) Date of Patent: Oct. 28, 2014

(54) TECHNIQUES FOR IMPROVING CACHE EFFECTIVENESS OF CACHES WITH LOW USER POPULATION

(75) Inventors: Bruce O. Anthony, Jr., Pine Island, MN (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/591,507

(22) Filed: Aug. 22, 2012

(65) Prior Publication Data

US 2014/0045476 A1 Feb. 13, 2014

Related U.S. Application Data

(63) Continuation of application No. 13/569,294, filed on Aug. 8, 2012.

(51) Int. Cl.
*H04M 3/00* (2006.01)

(52) U.S. Cl.
USPC ...... 455/418; 455/456.3; 370/229; 705/14.45

(58) Field of Classification Search
CPC ................................................ H04W 24/00
USPC ................ 455/456.3, 418; 370/229, 235; 705/14.45
See application file for complete search history.

(56) References Cited

U.S. PATENT DOCUMENTS

| 6,434,609 | B1 | 8/2002 | Humphrey |
| 6,499,088 | B1 | 12/2002 | Wexler et al. |
| 6,760,812 | B1 | 7/2004 | Degenaro et al. |
| 7,039,672 | B2 | 5/2006 | Wu et al. |
| 7,334,108 | B1 | 2/2008 | Case et al. |
| 7,716,425 | B1 | 5/2010 | Uysal et al. |
| 2005/0013245 | A1* | 1/2005 | Sreemanthula et al. ...... 370/229 |
| 2006/0020660 | A1* | 1/2006 | Prasad et al. .................. 709/203 |
| 2007/0005905 | A1 | 1/2007 | Yasue et al. |
| 2011/0230210 | A1* | 9/2011 | Drennan ..................... 455/456.3 |
| 2012/0239490 | A1* | 9/2012 | Friedl et al. ................ 705/14.45 |
| 2013/0013726 | A1* | 1/2013 | Westberg et al. ............ 709/213 |
| 2013/0014064 | A1* | 1/2013 | Zhu et al. ..................... 715/850 |

OTHER PUBLICATIONS

Chen et al., Data Mining: An Overview from a Database Perspective, IEEE Transactions on Knowledge and Data Engineering, vol. 8., No. 6 (Dec. 1996).

(Continued)

*Primary Examiner* — Shahriar Behnamian
(74) *Attorney, Agent, or Firm* — Jennifer R. Davis; Michael J. Chang, LLC

(57) ABSTRACT

Techniques for improving cache effectiveness in areas with low user population are provided. In one aspect, a computer-based method for managing user traffic in a cellular network using proxy caches is provided. The method includes the following steps. A group of the proxy caches that has correlated user traffic is identified. Cache requests for each of the proxy caches in the group are observed. One or more patterns are found in the cache requests. A prediction is made as to which items will be requested from the proxy caches in the group in the future based on the one or more patterns found in the cache requests. The proxy caches in the group are pre-populated with the items.

22 Claims, 2 Drawing Sheets

(56) References Cited

OTHER PUBLICATIONS

Chow, C,-Y. et al. "Group-Based Cooperative Cache Management for Mobile Clients in a Mobile Environment," Proceedings of the 2004 International Conference on Parallel Processing (ICPP '04), IEEE, pp. 83-90 (2004).

Chow, C.-Y. et al., "Distributed Group-Based Cooperative Caching in a Mobile Broadcast Environment," Proceedings of the 6th International Conference on Mobile Data Management (MDM 05). ACM, pp. 97-106 (2005).

Minh, T.N.T., et al., "An Efficient Model for Cooperative Caching in Mobile Information Systems," 2011 IEEE Workshops of International Conference on Advanced Information Networking and Applications (WAINA) pp. 90-95 (Mar. 2011).

* cited by examiner

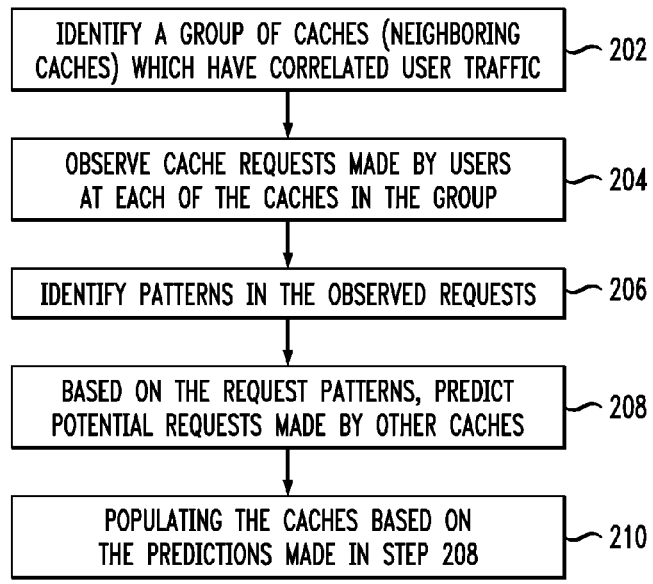
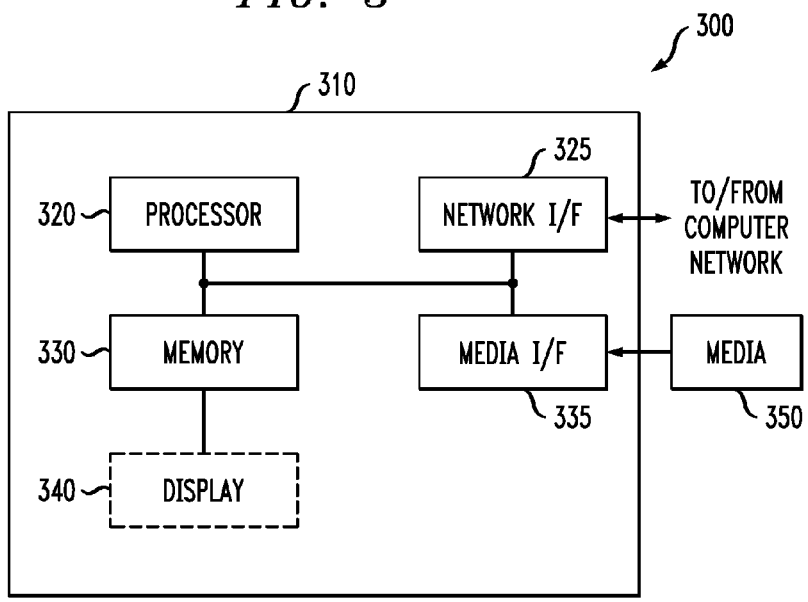

TECHNIQUES FOR IMPROVING CACHE EFFECTIVENESS OF CACHES WITH LOW USER POPULATION

CROSS-REFERENCE TO RELATED APPLICATION(S)

This application is a continuation of U.S. application Ser. No. 13/569,294 filed on Aug. 8, 2012, the disclosure of which is incorporated by reference herein.

FIELD OF THE INVENTION

The present invention relates to managing user traffic in a cellular network and more particularly, to techniques for improving cache effectiveness in areas with low user population.

BACKGROUND OF THE INVENTION

Caching is used to save the bandwidth on congested nodes in cellular networks. The cache is generally located near the base station for saving bandwidth.

However, when network caches are used in a cellular network, the caching effectiveness is not very high for points in the network where the user population is low. In general, caching effectiveness increases in direct proportion to the size of the user population. As a result, cache hit ratios are fairly low if a cache is implemented at a base station or in the case of high density radio access network (RAN) deployment, when a cache is implemented at a femto-cell, or at a micro-cell base station since the user population is low. Thus, benefits of savings on bandwidth reduction, or the improvement in user experience that caching can provide are not realized in these environments.

Accordingly, techniques that improve caching effectiveness in these low user population environments would be desirable.

SUMMARY OF THE INVENTION

The present invention relates to techniques for improving cache effectiveness in areas with low user population. In one aspect of the invention, a computer-based method for managing user traffic in a cellular network using proxy caches is provided. The method includes the following steps. A group of the proxy caches that has correlated user traffic is identified. Cache requests for each of the proxy caches in the group are observed. One or more patterns are found in the cache requests. A prediction is made as to which items will be requested from the proxy caches in the group in the future based on the one or more patterns found in the cache requests. The proxy caches in the group are pre-populated with the items.

A more complete understanding of the present invention, as well as further features and advantages of the present invention, will be obtained by reference to the following detailed description and drawings.

BRIEF DESCRIPTION OF THE DRAWINGS

FIG. 2 is a diagram illustrating an exemplary methodology for managing user traffic in a cellular network, such as the 3G cellular network of FIG. 1, using proxy caches according to an embodiment of the present invention; and FIG. 3 is a diagram illustrating an exemplary apparatus for performing one or more of the methodologies presented herein according to an embodiment of the present invention.

DETAILED DESCRIPTION OF PREFERRED EMBODIMENTS

Figure 1:
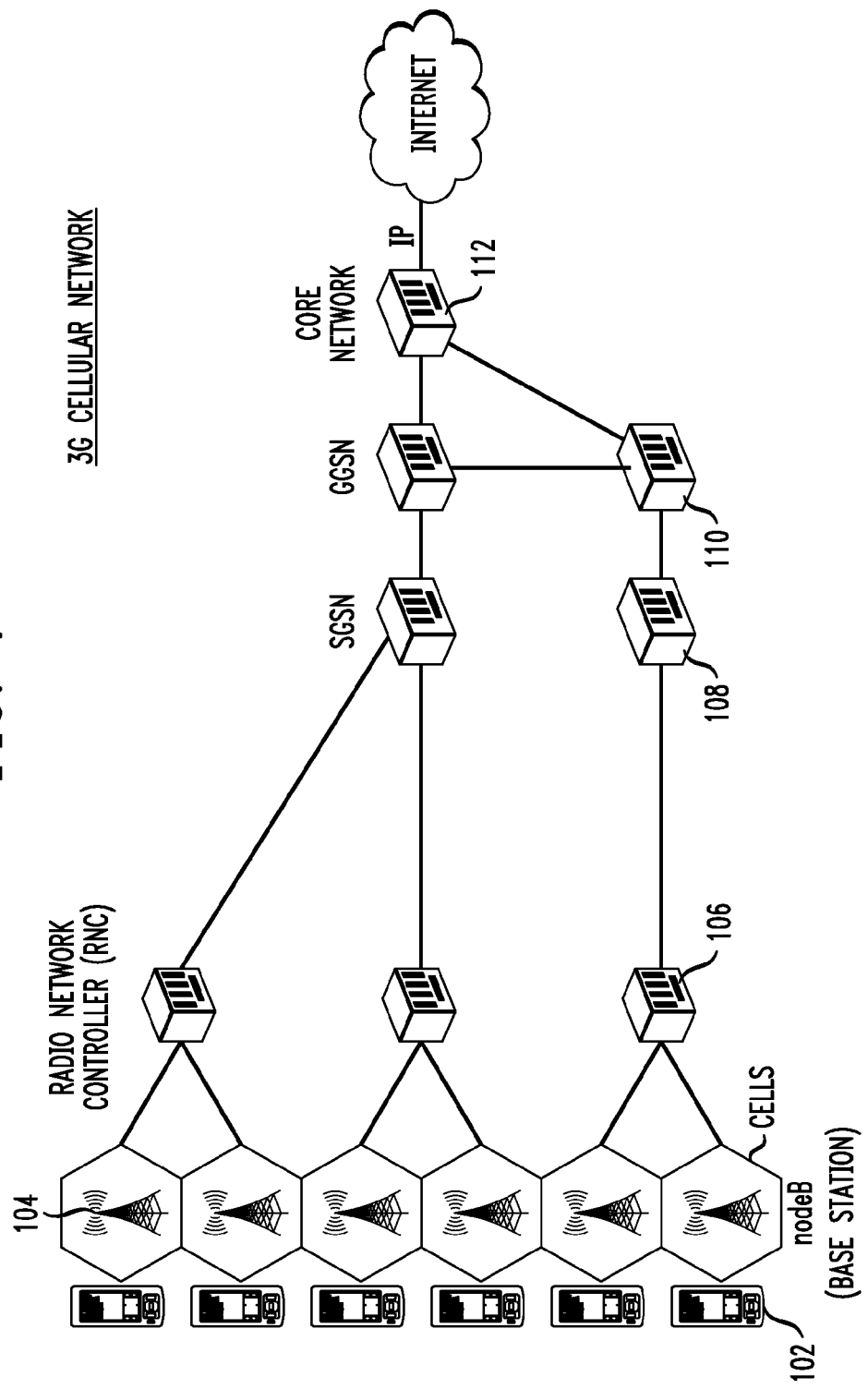
FIG. 1 is a diagram illustrating high-level architecture of a 3G cellular network according to an embodiment of the present invention.

Provided herein are techniques for improving the effective cache hit ratio of caches which do not have a sufficiently large user population. FIG. 1 is a diagram illustrating high-level architecture of a 3G cellular network which provides the framework for the present techniques. As shown in FIG. 1, the 3G cellular network includes user equipment 102 (e.g., mobile telephones, PDAs, PCs, laptop computers, etc.) that can communicate wirelessly with radio network controllers (RNCs) 106 through a plurality of base stations 104, e.g., base stations located in cell towers, (called nodeB in currently deployed UMTS or 3GPP networks).

The 3G cellular network covers a geographical area by means of a hierarchy of cells, i.e., regions that are serviced by a base station. See FIG. 1. According to an exemplary embodiment, one or more of the base stations 104 can receive wireless transmissions from the user equipment 102 and are connected directly to a given one of the RNCs 106.

As shown in FIG. 1, each user equipment 102 generally sits at a particular base station 104. As also shown, multiple base stations 104 form a hierarchy back to a particular RNC 106. Multiple RNCs 106 are connected together under the control of a serving general packet radio service (GPRS) support node (SGSN). Multiple SGSN nodes are supported by a gateway GPRS support node (GGSN). GPRS is a standard specification for transport of data packets on a cellular network.

As shown in FIG. 1, data flow through the 3G cellular network passes from the RNCs 106 to a core network 112 through the SGSN and GGSN nodes. Data traffic from the core network 112 is directed toward public data networks like the Internet.

There are a (relatively) small number of GGSN nodes in any cellular network. The number of nodes increases in a hierarchical manner so that there are about 100,000 nodeBs in an average country in which a typical cellular operator provides its services. In many such environments, the links that connect the nodeB (base stations) to the RNCs, and/or the links that connect the RNCs to the SGSNs are comprised of microwave links and are congested. In other cases, there may be fiber connections on the links.

Payment to a cellular operator for link bandwidth is generally calculated based on usage. Therefore, it is cost-effective for a cellular operator to save bandwidth. A useful technique to save bandwidth is through the use of caching proxies. By way of example only, when a caching proxy is placed at a nodeB, the caching proxy can save the bandwidth needed on the links connecting the nodeB to the RNC.

In this context, there are two important metrics that come into play. The first metric is Cache Hit Ratio. Cache Hit Ratio is the probability that a request made by a user will be to content that is already in the cache because the content was previously requested by a user. The Cache Hit Ratio is low in the nodeB because there are (relatively) fewer users per nodeB.

The second metric is Cache Benefit. Cache Benefit is the amount of savings in bandwidth or improvement in user quality of experience which is obtained on a cache hit. In order to maximize the benefit (e.g., reduction in the cost of bandwidth that needs to be carried), the cache proxy should be located as close to the user (user equipment) as possible. This is due to the fact that congestion usually occurs on the links between the RNC and base station.

However, since the Cache Hit Ratio is not very high at the nodeB (base station), the Cache Benefits are reduced. Advantageously, the present techniques serve to improve the Cache Hit Ratio of the caches where the user population is low. Generally, the present techniques are directed to using clustering (based for example on geography) to improve the cache hit ratios. As provided above, caches become more effective when the user population is large. It has been observed however that the cache access patterns of users in some clusters are correlated. Thus, by observing behavior and correlation among user access patterns among different caches with a small user population, one can extrapolate and preposition content in caches so that the effective cache hit ratio is increased.

The present techniques are now described in detail by way of reference to FIG. 2. FIG. 2 is a diagram illustrating an exemplary methodology 200 for managing user traffic in a cellular network, such as the 3G cellular network of FIG. 1, using proxy caches. Using the cellular network of FIG. 1 as an example, proxy caches may be implemented at one or more of the nodeB (base stations). As provided above, user populations at these points in the network are low. Thus, with conventional schemes, the cache hit ratios are low when proxy caches are implemented at the base stations. However, the present techniques involve extrapolating access patterns from correlated user traffic to address these concerns and to increase cache hit ratios.

First, in step 202, groups of the proxy caches having correlated user traffic are identified. In the case of a hierarchical cellular network (such as that shown in FIG. 1), step 202 can be performed on the basis of geographic affinity. By way of example only, an assumption can be made that the user access patterns in all base stations that are located in the same geographic area are identical. A given geographic area can be defined in a number of different ways.

According to one exemplary embodiment, a geographic area is defined by pre-existing/pre-defined geographical boundaries, such as those defining towns, cities, counties, etc. Thus, for instance, each of the cities and/or towns in a given county would make up a different geographic area. Typically, there are multiple counties in a given state. Thus, each state would contain many different geographic areas.

This exemplary grouping scenario operates under the assumption that the user access patterns in all of the base stations in a given geographic area (in this case as defined by town/city, county, etc.) are the same. Using a simple example, if a given geographic area is defined as the town of Yorktown Heights in New York State, then it is assumed that the user access patterns in each of the base stations located in the town of Yorktown Heights are the same. Thus, the proxy caches implemented at those base stations are considered herein to have correlated user traffic, and are grouped together for the purposes of the method.

The geographic area does not have to be defined based on pre-existing/pre-defined geographical boundaries (such as on a town-by-town/city-by-city, county-by-county, etc. basis). The geographic area can be defined in other ways. For example, according to another exemplary embodiment, the geographic area is defined by looking at the demographics of an area (i.e., statistical characteristics of a population of individuals living in an area). In this example, it is assumed that user access patterns in all of the base stations in an area where users have a same demographic are the same. An example of the use of demographics is provided below, where the geographic area is defined based on zip-codes that have a certain mean income associated therewith. Using the demographic of mean income as an example, all the proxy caches implemented at base stations located in areas (defined for example by zip-code) which have a mean income within a certain (pre-determined) range are considered in this case to have correlated user traffic, and are grouped together for the purposes of the method. Demographic data is readily available since such data is routinely collected for commercial (e.g., advertising) and non-commercial purposes by a number of different companies and agencies.

Alternatively, according to yet another exemplary embodiment, the geographic area is defined based on physical proximity (of a base station) to a particular location. In this example, it is assumed that user access patterns in all of the base stations that are located within a certain distance from a particular location(s) are the same. As an example, a geographic area may be defined based on physical proximity of a base station(s) to a college or university campus. For instance, the geographic area may be defined as encompassing an area that is within X miles (e.g., 5 miles) from the college or university campus. Here it is assumed that user access patterns in all of the base stations located within X miles from the college or university campus are the same. In this example, it is assumed that students tend to have similar access patterns.

As highlighted above, in another example, a geographic area may be defined as zip-codes in the United States that have a certain mean income/mean income range. Thus, a geographic area could be discontinuous (i.e., the geographic area is made up of multiple physical areas (in this case zip-codes) two or more of which are not physically continuous with one another). Using the zip-code/mean income definition as an example, zip-codes having a certain mean income (or alternatively a mean income within a certain range) are likely distributed throughout different parts of the United States. Thus, grouping these zip code regions together into a single geographic area would be an example of a discontinuous geographic area.

In a derivation of the above-described concept of defining a geographic area based on physical proximity (of a base station) to a particular location, according to still yet another exemplary embodiment, another way of defining a geographic area could be on the basis of the physical proximity of base stations to a particular type of landmark. Here a distinction is being made between a particular physical location, such as a college or university (see above), and a particular type of physical location or landmark, like exits off of a highway.

For instance, base stations that are located near highway exit/egress points may be grouped together as one geographic area, while base stations located near (e.g., within a certain predetermined distance from) areas of highway that are far away from (e.g., greater than a certain predetermined distance away from) any exit/egress are classified into another geographic area. Again in this case the geographic area could be discontinuous. Using a simple example, for a given highway, the base stations located 1 mile or less from an exit/egress of the given highway would be considered as one geographic area, and the base stations located greater than 1 mile away from an exit/egress of the given highway would be considered as another geographic area. The rationale behind this is that people who are near an exit tend to look for information for facilities that are near the exit, while people who are further away from the exit points would tend to look at more general types of information, as opposed to specific facilities near them. Here it is assumed that user access patterns in all of the base stations located near (i.e., within a predetermined distance from) a highway exit/egress are the same, and that user access patterns in all of the base stations located away from (i.e., greater than a predetermined distance away from) a highway exit/egress are the same.

It is notable that some networks may not follow a hierarchical cellular network structure like the cellular network of FIG. 1. Examples of such non-hierarchical networks are mesh networks used to provide connectivity in remote areas, mobile ad-hoc networks in which the topology of the network dynamically varies, and networks that are structured in a general graph topology.

In the case of networks other than a hierarchical cellular network correlations among the different proxy caches can be determined based on statistical analysis of the requests made to different caches. Namely, the proxy cache access logs can be analyzed. Typically, the entries in a proxy access log contain for any content requested: the URL of the requested content, the date/time of the request, the size of the document, file, image, etc. The term "content" as used herein generally refers to any item that a user might request from the proxy cache. For instance, content may include websites (identifiable by a certain uniform resource locator (URL)), documents, files, images, software, etc.

Access patterns in the logs can then be analyzed for statistical correlations. The correlation among access patterns of different caches can be computed using standard statistical techniques to determine the request patterns in one cache that are most highly correlated with the request patterns made by other caches. The concept of cache request patterns will be described in detail below. However, one simple example of one way in which correlation can be done is by looking for similarities in the most popular content among the caches. Here the cache request patterns would simply be repeat requests for a particular item or items. For instance, if one looks at the top 50 popular (most requested—based on the number of times the item was requested from the proxy cache) items in each of the caches, and there are several common entries in the top 50 of more than one of the proxy caches, then the amount of overlap can be used as a measure of high correlation. By way of example only, those proxy caches having at least 10 of the 50 most requested items in common might be considered to have a high level of correlation, and thus may be grouped in step 202. Of course, this is only an example, and the level of correlation sought can be adjusted up or down if so desired. The proxy caches grouped together in step 202 into a particular group are also referred to herein as "neighboring proxy caches" or more simply "neighboring caches." Thus, if proxy cache-1 and proxy cache-2 are grouped together in step 202, then proxy cache-1 and proxy cache-2 are considered herein to be neighboring caches.

Other statistical correlation techniques can look at the access distribution histogram among the caches, and use a standard measure of statistical similarity to compare whether the access patterns are correlated. Again here the level of correlation sought can be adjusted up or down if so desired. The use of access distribution histograms to find correlation given the access logs from a plurality of caches and a given desired level of similarity would be within the abilities of one of skill in the art who is provided with the present teachings.

According to an exemplary embodiment, the steps of methodology 200 are implemented by way of two systems that are run in the hierarchy of the cellular network. By way of example only, the two systems can consist of i) a cache trace collector that runs at each of the proxy caches at nodeB (base station) and ii) a cache analyzer that runs in the RNC or core of the network (see FIG. 1). Trace collector and analyzer software tools are commercially available. A cache populator (also a commercially available software tool) may be employed to preload the caches in the group with anticipated objects likely to be accessed in the future (see below). The cache trace collector, cache analyzer and cache populator may be run by an apparatus, such as apparatus 300 of FIG. 3, described below.

By way of example only, with this exemplary configuration, the cache trace collector can be used to report the sequence of requests that are made at each of the nodeB caches in the network. This data is then uploaded periodically to the cache analyzer, e.g., at an interval of once every 20 minutes, or after 1,000 requests. The cache analyzer will determine the cluster of caches that have a high degree of correlation based on past history. In the case of a hierarchical cellular network such as the cellular network in FIG. 1, this could be reduced to looking for caches in the same geographical location.

Once the caches whose request streams are correlated are identified and grouped (either based on a geographical affinity or based on statistical analysis of requests, as described above), information from the access pattern of one of the caches in each group can be used to identify which requests are highly likely to be made from other caches in the same group. Those objects, that are highly likely to be requested, can then be pre-populated in the caches, so that their effective hit ratio can be increased. The specific steps for extracting the access pattern information, identifying likely requests and pre-populating the caches for a given grouping of caches is now described in detail.

In step 204, the cache requests for each proxy cache in a group are observed using, e.g., the cache trace collector. As provided above, data from the cache trace collector is uploaded periodically to the cache analyzer, e.g., at an interval of once every 20 minutes, or after every 1,000 requests. Thus, a new stream of user traffic will be analyzed every, e.g., 20 minutes, or after every 1,000 requests. Thus, the request patterns (see description of step 206, below) from a given stream of user traffic can be used to predict request patterns in future streams of user traffic throughout the group of proxy caches. Namely, as will be described in detail below, the request patterns found in a given stream of user traffic indicate what objects are likely to be requested in future requests in that group of proxy caches. Thus, by pre-populating the caches in the group (e.g., by way of the cache populator, see above) with these objects (i.e., before they are requested) will effectively increase the cache hit ratios through the group.

Specifically, in step 206, request patterns are identified in the cache requests observed in each of the caches (from step 204). Step 206 may be performed using the cache analyzer (see above), wherein standard statistical techniques can be used to determine the request patterns in the observed cache requests. Namely, what each proxy cache will report (e.g., by way of the cache trace collector) is a series of accesses made by users (also referred to herein as "request logs"). These accesses can be logically thought of as a set of records of the format <time-stamp, user-identity, URL-accessed>. After some time (e.g., every 20 minutes, or every 1,000 requests), these records are sent to the cache analyzer. The cache analyzer can then look for patterns in each of the proxy cache request logs. Using the above example wherein the patterns sought are the 50 most requested items in each of the caches, if an item is one of the top 50 most requested items (based on the number of times the item was requested from the proxy cache) in at least one of the caches in the group, then according to the present techniques it is considered likely that requests will be made to other caches in the group for at least one of those top 50 items. So, those top 50 items are all pre-populated to all of the caches in the group, even if those items are not in the top 50 list for some of the caches in the group on which the items are pre-populated. Of course, the use of the top 50 requested items is merely exemplary and one of ordinary skill in the art would be able to ascertain for a given situation the appropriate number of popular items to pre-populate in the caches of a group. For instance, a greater or lesser number (than 50) of popular (most frequent) items may be predetermined depending for example on the user population for a given geographic area (defined as described above). Again this adjustment would be well within the capabilities of one of skill in the art given the present teachings. Identifying request patterns based on the most popular/frequent accesses represents one exemplary request pattern technique used herein, i.e., Pattern A: Membership in the most frequent x number (e.g., top-50) of accesses in any proxy cache.

The determination of patterns in the request logs can, however, be based on a more complex scheme than just simply looking for the top x-most requested items. For instance, the request logs may be analyzed for one or more of the following, non-limiting, exemplary patterns:

Pattern B: Probability Distribution of items (e.g., URLs) accessed in increasing order of popularity (as measured, for example, based on the number of times an item was requested from the proxy cache with a greater number of requests being equated with a greater popularity), and correlations among these probability distributions. As is known in the art, probability distributions are functions that describe the probability of a variable taking a certain value. In this case, the probability distribution for a given cache will illustrate the popularity of items requested from the given cache. As will be described in detail below, the probability distributions for the caches can be compared to find correlations among the requested items, which can be used to predict items (e.g., a top 100 items) that based on this analysis are likely to be requested from caches in the group. Given the description of the instant process both here and below, one of skill in the art would be capable of implementing probability distributions to predict the likeliness of item requests in the future.

Pattern C: Access to a given item (e.g., URL-2) happens within some time of access to another item (e.g., URL-1) with some probability (e.g., every time someone accesses google.com/IBM, there is an 80% probability an access to youtube.com/IBM is made within 10 seconds). Basically, with Pattern C the probability of one item being accessed (requested) within a certain period of time after another item has been accessed (requested) (for example from the same cache) is determined.

Pattern D: Every time a given item (e.g., URL-1) is accessed in a given cache (e.g., cache-1), the given item is accessed with some probability in another cache (e.g., cache-2) within a certain amount of time (e.g., within the next 5 seconds, etc.). Basically, with Pattern D the probability that an item, once accessed in one cache (requested), will also be accessed by another cache in the group (requested) within a certain period of time is determined.

These Patterns can be computed in a variety of ways. As an illustrative example, Pattern A can be determined by computing the top-50 URLs accessed in proxy cache-1 and comparing that to the top-50 URLs contained in the top-50 URLs of a proxy cache-2. If it is seen that a large number of URLs (for example, 20 or more URLs) are occurring in both proxy cache-1 and proxy cache-2, then a prediction can be made that the occurrence of a URL or URLs in proxy cache-1 can be used to predict that the same URL(s) is/are likely to be accessed in proxy cache-2 in the future. This prediction can then be used to create a set of URLs that are highly likely to be accessed in any proxy cache in the near future, e.g., by combining the top-50 URLs that are contained in all of its neighboring caches.

When Pattern B is used, the items (e.g., URLs) that are accessed in the neighboring caches are compared, which is the same as with Pattern A, except that the history of access over a longer time-period is considered. According to an exemplary embodiment, the calculation of patterns is done at periodic intervals, e.g., once every x minutes (e.g., every 5 minutes). Based on some number of calculations, e.g., information collected over the last hour, one calculates the probability that a given item (e.g., URL) is likely to be seen in a proxy cache if that given item is seen in the neighboring proxy caches. This can be done by means of computing the actual occurrences in the history collected over the last x number of periods (e.g., for the 20 periods spanning previous hour (of 5 minutes per period)). Based on this probability, one can assign a probability of access to each URL, and select some top 100 URLs which are highly likely to be accessed in the future.

Pattern C and Pattern D are also analyzed by looking at information over a number of periods, for example the calculation of patterns is done at periodic intervals, e.g., once every x minutes (e.g., every 5 minutes). However, a different metric is calculated. In this case, one looks for the type of URLs that are accessed together or within a certain period. One way to calculate these Patterns is to compute the set of all accessed URLs, and create a matrix where both the horizontal and vertical entries contain the URLs that are accessed. Each entry in the matrix counts how many times one URL is seen after another. Then the set of pairs that have the highest counts are selected as being the ones more likely to occur. By way of example only, for a group of neighboring caches, here the method can look to see how many times one item (e.g., URL B) is seen after another item (e.g., URL A) in a certain period of time. Say for example that URL B is seen after URL A 100 times, URL D is seen after URL C 98 times, and URL F is seen after URL E 90 times, etc. The number of hits here would be ranked 100, 98, 90, . . . , etc. The highest counts in this ranking, for example, the top predetermined x (e.g., 50 counts), are then selected and the corresponding items (e.g., URLs) are pre-populated in the caches in the group. In the simple example just provided, URLs A-F would all be pre-populated in the caches in the group since they are included in the top (e.g., 50) hits ranking. Given the description of the instant process, one of skill in the art would be capable of determining the probability of one item being accessed within a certain period of time after another item has been accessed (Pattern C) and the probability that an item, once accessed in one cache, will also be accessed by another cache in the group within a certain period of time (Pattern D).

These above-described Patterns are but a subset of a general class of pattern extraction methodologies in the art of data mining. Many other sophisticated methodologies known in the art can be used in accordance with the present techniques. Such methodologies can be found in Chen et al., "Data Mining: An Overview from a Database Perspective, IEEE Transactions on Knowledge and Data Engineering, vol. 8., no. 6 (December 1996), the contents of which are incorporated by reference herein.

In step 208, based on the patterns in the observed cache requests (from step 206), predictions are made as to which objects are likely to be requested by the caches in the group in the future. By way of example only, consider the case where each cache is tracking the top 50 most-popular (most-requested) sites within itself. When an item appears in one of the top 50 groups in a specific cache, it is considered to be likely to be requested by the other caches in the same group, even if it does not appear in their top 50 list.

In other variations of this idea, priority or weights may be included with each of the items. In this example, in order to determine the top 50 sites likely to be accessed by each of the caches, each of the items appearing in any one of the caches in the group is assigned a weight which indicates how many users requested that item from the given cache. The weights assigned to each of the items in the different caches in the group are summed up, and the top 50 entries with the highest cumulative sums are considered the most likely to be accessed in each of the caches in the group. To use a simple example, say item x was requested by 5 users from cache 1, then item x would get a weighting of 5 in cache 1. If item x was requested by 6 users from cache 2, then item x would get a weighting of 6 in cache 2. Since cache 1 and cache 2 are in the same group of caches, then the weighting of item x in both cache 1 and cache 2 would be added together (i.e., 5+6=11). This weight of 11 would then be compared with the weightings of other items in the caches in the group and the top (e.g., 50) weighted items would be pre-populated into the caches in the group. Of course, there are likely more than two caches in the group, but the use of two caches is done merely to illustrate the principles being employed.

Other types of weighting schemes, which take into account statistic distributions or give more weight to requests from the specific site, can also be developed along similar principles. Instead of just being simple numbers, the weights could be measured as the probability of a URL being accessed in the group of proxy caches over some given period of time. One could also determine that among the set of proxy caches surrounding a given proxy cache for which calculations are being done (i.e., neighboring caches), all proxy caches are not equal. As an example, consider the calculations being done for a proxy cache which is located at the intersection of a major highway and a small road. Entries occurring in neighboring caches which are located along the highway are multiplied by a factor of 4 to given them more priority than the caches which happen to be located along the small road. This is to account for the fact that the access patterns along the highway are more likely to influence access in the proxy cache at the intersection than those along the smaller road.

Using the predictions from step 208, in step 210 the caches in the group are pre-populated with the objects determined in step 208 to be most likely to be requested from the caches in the group. By pre-populating the caches, the effective hit ratio can be increased even when the user population is low (i.e., the user population for a given one of the caches in the group is low).

Turning now to FIG. 3, a block diagram is shown of an apparatus 300 for implementing one or more of the methodologies presented herein. By way of example only, apparatus 300 can be configured to implement one or more of the steps of methodology 200 of FIG. 2 for managing user traffic in a cellular network, such as the 3G cellular network of FIG. 1, using proxy caches.

Apparatus 300 comprises a computer system 310 and removable media 350. Computer system 310 comprises a processor device 320, a network interface 325, a memory 330, a media interface 335 and an optional display 340. Network interface 325 allows computer system 310 to connect to a network, while media interface 335 allows computer system 310 to interact with media, such as a hard drive or removable media 350.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to identify a group of the proxy caches that has correlated user traffic; observe cache requests for each of the proxy caches in the group; find one or more patterns in the cache requests; predict which items will be requested from the proxy caches in the group in the future based on the one or more patterns found in the cache requests; and pre-populate the proxy caches in the group with the items.

The machine-readable medium may be a recordable medium (e.g., floppy disks, hard drive, optical disks such as removable media 350, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 320 can be configured to implement the methods, steps, and functions disclosed herein. The memory 330 could be distributed or local and the processor device 320 could be distributed or singular. The memory 330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 320. With this definition, information on a network, accessible through network interface 325, is still within memory 330 because the processor device 320 can retrieve the information from the network. It should be noted that each distributed processor that makes up processor device 320 generally contains its own addressable memory space. It should also be noted that some or all of computer system 310 can be incorporated into an application-specific or general-use integrated circuit.

Optional display 340 is any type of display suitable for interacting with a human user of apparatus 300. Generally, display 340 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. An apparatus for managing user traffic in a cellular network using proxy caches, the apparatus comprising:
   a memory; and
   at least one processor device, coupled to the memory, operative to:
      identify a group of the proxy caches that has correlated user traffic, wherein the correlated user traffic takes multiple paths through the cellular network and the proxy caches in the group are present along different paths through the cellular network, wherein the cellular network comprises multiple base stations at one or more of which the proxy caches are implemented and thus a user population for a given one of the proxy caches in the group is based on a low user population at the base stations in the cellular network, wherein the proxy caches that are present at the base stations physically located within a given geographical area are considered to have correlated user traffic and are grouped, and wherein the given geographical area is defined based on correlated user access patterns;

observe cache requests for each of the proxy caches in the group;

find one or more user access patterns in the cache requests for each of the proxy caches in the group, wherein at least one of the user access patterns is based on a probability distribution of items accessed from the proxy caches, and wherein the probability distribution is used to i) determine a probability of a given item being in a proxy cache in the group if that given item is in neighboring proxy caches in the group and ii) assign a probability of user access to each of the items;

predict which items will be requested from the proxy caches in the group in the future based on the one or more patterns found in the cache requests; and pre-populate the proxy caches in the group with the items to increase a cache hit ratio even when the user population for a given one of the proxy caches in the group is based on the low user population at the base stations.

2. The apparatus of claim 1, wherein the base stations are connected to at least one radio network controller through which data flow from user equipment passes to a core network, wherein one of the proxy caches is present at each of the base stations, and wherein the proxy caches in the group are present along different paths through the cellular network between the user equipment and the core network.

3. The apparatus of claim 2, wherein finding the one or more patterns in the cache requests and predicting which items will be requested from the proxy caches in the group in the future based on the one or more patterns found in the cache requests are performed using a cache analyzer run by the apparatus.

4. The apparatus of claim 3, wherein the cache analyzer is run at the at least one radio network controller.

5. The apparatus of claim 1, wherein the at least one processor device is further operative to:
define the given geographical area based on pre-existing geographical boundaries.

6. The apparatus of claim 5, wherein the pre-existing geographical boundaries comprise pre-existing geographical boundaries defining towns or cities.

7. The apparatus of claim 1, wherein the at least one processor device is further operative to:
define the given geographical area based on user demographics, wherein the given geographical area comprises users of a certain demographic.

8. The apparatus of claim 1, wherein the at least one processor device is further operative to:
define the given geographical area based on physical proximity of the base stations within the given geographical area to a particular location.

9. The apparatus of claim 8, wherein the given geographical area is defined based on the base stations within the given geographical area being located within a certain distance from a particular type of landmark.

10. The apparatus of claim 9, wherein the landmark comprises a college or a university.

11. The apparatus of claim 9, wherein the landmark comprises an exit on a highway.

12. The apparatus of claim 1, wherein the given geographical area comprises multiple areas two or more of which are not physically continuous with one another.

13. The apparatus of claim 1, wherein observing the cache requests for each of the proxy caches in the group is performed using one or more cache trace collectors run by the apparatus.

14. The apparatus of claim 13, wherein one of the cache trace collectors is run at each of the proxy caches.

15. The apparatus of claim 1, wherein the at least one processor device is further operative to:
assign weights to each of the items in each of the proxy caches in the group which indicate how many users requested the items.

16. The apparatus of claim 1, wherein the at least one processor device, when finding one or more patterns in the cache requests, is further operative to:
identify a popularity of the items in each of the proxy caches in the group based on a number of times the items were requested from each of the proxy caches in the group.

17. The apparatus of claim 16, wherein the at least one processor device is further operative to:
pre-populate the proxy caches in the group with the items that are most popular in each of the proxy caches in the group, wherein the items that are most popular in a given one of the proxy caches are those items requested more than a predetermined number of times from the given proxy cache.

18. The apparatus of claim 17, wherein pre-populating the proxy caches in the group is performed using a cache populator run by the apparatus.

19. The apparatus of claim 1, wherein the at least one processor device, when finding one or more patterns in the cache requests, is further operative to:
determine a probability of one of the items being requested from a given one of the proxy caches in the group within a given period of time after another one of the items has been requested from the given proxy cache.

20. The apparatus of claim 1, wherein the at least one processor device, when finding one or more patterns in the cache requests, is further operative to:
determine a probability that one of the items, once requested from one of the proxy caches in the group, will also be accessed by another one of the caches in the group within a certain period of time.

21. An article of manufacture for managing user traffic in a cellular network using proxy caches, comprising a machine-readable non-transitory recordable medium containing one or more programs which when executed implement the steps of:
identifying a group of the proxy caches that has correlated user traffic, wherein the correlated user traffic takes multiple paths through the cellular network and the proxy caches in the group are present along different paths through the cellular network, wherein the cellular network comprises multiple base stations at one or more of which the proxy caches are implemented and thus a user population for a given one of the proxy caches in the group is based on a low user population at the base stations in the cellular network, wherein the proxy caches that are present at the base stations physically located within a given geographical area are considered to have correlated user traffic and are grouped, and wherein the given geographical area is defined based on correlated user access patterns;

observing cache requests for each of the proxy caches in the group;

finding one or more user access patterns in the cache requests for each of the proxy caches in the group, wherein at least one of the user access patterns is based on a probability distribution of items accessed from the proxy caches, and wherein the probability distribution is used to i) determine a probability of a given item being in a proxy cache in the group if that given item is in neighboring proxy caches in the group and ii) assign a probability of user access to each of the items;

predicting which items will be requested from the proxy caches in the group in the future based on the one or more patterns found in the cache requests; and pre-populating the proxy caches in the group with the items to increase a cache hit ratio even when the user population for a given one of the proxy caches in the group is based on the low user population at the base stations.

22. A computer-based method for managing user traffic in a cellular network using proxy caches, the method comprising the steps of:

identifying a group of the proxy caches that has correlated user traffic, wherein the correlated user traffic takes multiple paths through the cellular network and the proxy caches in the group are present along different paths through the cellular network, wherein the cellular network comprises multiple base stations at one or more of which the proxy caches are implemented and thus a user population for a given one of the proxy caches in the group is based on a low user population at the base stations in the cellular network, wherein the proxy caches that are present at the base stations physically located within a given geographical area are considered to have correlated user traffic and are grouped, and wherein the given geographical area is defined based on correlated user access patterns;

observing cache requests for each of the proxy caches in the group;

finding one or more user access patterns in the cache requests for each of the proxy caches in the group, wherein at least one of the user access patterns is based on a probability distribution of items accessed from the proxy caches, and wherein the probability distribution is used to i) determine a probability of a given item being in a proxy cache in the group if that given item is in neighboring proxy caches in the group and ii) assign a probability of user access to each of the items;

predicting which items will be requested from the proxy caches in the group in the future based on the one or more patterns found in the cache requests; and pre-populating the proxy caches in the group with the items to increase a cache hit ratio even when the user population for a given one of the proxy caches in the group is based on the low user population at the base stations.

* * * * *